United States Patent
Spears et al.

(10) Patent No.: US 7,333,250 B2
(45) Date of Patent: Feb. 19, 2008

(54) IMAGE SCANNER WITH A SINGLE MOTOR PROVIDING TWO-DIMENSIONAL MOVEMENT OF PHOTOSENSORS

(75) Inventors: Kurt E. Spears, Fort Collins, CO (US); David W. Boyd, Greeley, CO (US); Robert G Gann, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 954 days.

(21) Appl. No.: 10/066,535

(22) Filed: Jan. 31, 2002

(65) Prior Publication Data

US 2003/0141443 A1    Jul. 31, 2003

(51) Int. Cl.
*H04N 1/04* (2006.01)
*H04N 1/387* (2006.01)

(52) U.S. Cl. .................. 358/497; 358/474; 358/483; 358/450

(58) Field of Classification Search ............... 358/472, 358/473, 497, 494, 474, 471, 505, 506, 487, 358/486, 488, 450, 453, 211, 212; 382/313, 382/312, 318, 319, 284; 250/234–236; 399/211–212; 318/685, 696, 34
See application file for complete search history.

(56) References Cited

U.S. PATENT DOCUMENTS

| | | | | |
|---|---|---|---|---|
| 4,692,812 A | | 9/1987 | Hirahara et al. | 358/443 |
| 5,818,610 A | | 10/1998 | Bromley et al. | 358/473 |
| 5,825,044 A | | 10/1998 | Allen et al. | 250/557 |
| 6,144,778 A | | 11/2000 | Beauchamp et al. | 382/318 |
| 6,147,780 A | * | 11/2000 | Chiang | 358/497 |
| 6,392,761 B1 | * | 5/2002 | Suzuki et al. | 358/473 |
| 6,721,465 B1 | * | 4/2004 | Nakashima et al. | 382/318 |
| 6,965,460 B1 | * | 11/2005 | Gann et al. | 358/471 |

FOREIGN PATENT DOCUMENTS

| | | | |
|---|---|---|---|
| JP | 01034060 A | * | 2/1989 |
| JP | 100028200 | | 1/1998 |
| JP | 11-252322 | | 9/1999 |
| WO | WO85/01629 | | 4/1985 |

* cited by examiner

*Primary Examiner*—Cheukfan Lee
(74) *Attorney, Agent, or Firm*—Agustus W. Winfield (57) ABSTRACT

An image scanner has a movable photosensor array that can be moved in two dimensions in a plane. Two dimensional movement is provided using a single motor.

3 Claims, 10 Drawing Sheets

IMAGE SCANNER WITH A SINGLE MOTOR PROVIDING TWO-DIMENSIONAL MOVEMENT OF PHOTOSENSORS

FIELD OF INVENTION

This invention relates generally to image scanners.

BACKGROUND OF THE INVENTION

Image scanners, also known as document scanners, convert an image on a document or photograph, or an image in a transparent medium, into an electronic form suitable for copying, storing or processing by a computer. An image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices. Transparency image scanners pass light through a transparent image, for example a photographic positive slide, through optics, and then onto an array of photosensitive devices. The optics focus at least one line, called a scanline, on the image being scanned, onto the array of photosensitive devices. The photosensitive devices convert received light intensity into an electronic signal. An analog-to-digital converter converts the electronic signal into computer readable binary numbers, with each binary number representing an intensity value.

There are two common types of image scanners. In a first type, a reduction lens system is used to focus the scanline onto the photosensor array, and the length of the photosensor array is much less than the length of the scanline. In a second type, an array of lenses is used to focus the scanline onto the photosensor array, and the length of the photosensor array is the same length as the scanline.

There is an ongoing need to reduce the cost of image scanners. There is also an ongoing need to scan surfaces larger than typical documents.

SUMMARY OF THE INVENTION

An image scanner has a movable photosensor array that can be moved in two dimensions in a plane. In multiple example embodiments, two dimensional movement is provided using a single motor.

DETAILED DESCRIPTION OF THE PREFERRED EMBODIMENT OF THE INVENTION

Photosensor arrays for image scanners typically have thousands of individual photosensitive elements. Each photosensitive element, in conjunction with the scanner optics system, measures light intensity from an effective area on the document defining a picture element (pixel) on the image being scanned. Optical sampling rate is often expressed as pixels per inch (or mm) as measured on the document (or object, or transparency) being scanned. Optical sampling rate as measured on the document being scanned is also called the input sampling rate. The native input sampling rate is determined by the optics and the pitch of the individual sensors. Given a native input sampling rate, and a scanline length, the total number of photosensor sites required to scan an entire scanline with a single exposure is given by: Number of photosensors=(scanline length)*(native input sampling rate). For example, if the scanline is 25 cm long, and the native sampling rate is 500 pixels per cm, then 12,500 photosites are needed to capture 12,500 pixel intensities with one exposure.

A photosensor array, in conjunction with its associated optics system, is a major portion of the cost of a scanner. In addition, the photosensor array, in conjunction with its associated optics system, typically determines the maximum length of one dimension of a document or other surface to be scanned. In the following example embodiments, given a native input sampling rate and a scanline length, an image scanner has a photosensor array that has fewer photosensors than the number of pixels for the scanline and the native input sampling rate. Multiple swaths are scanned, with each swath providing a subset of the pixels for each scanline. For a given scanline length, reducing the number of photosensors reduces the cost of the photosensor array. Viewed alternatively, given a fixed number of photosensors, multiple swaths per scanline enables longer scanlines to be scanned.

Photosensor arrays for scanners having reduction optics (where the overall length of the photosensor array is much less than the length of the scanline) are typically fabricated as a single integrated circuit die. The cost of an integrated circuit is typically a function of die area. If the die can be made smaller, the cost is typically reduced. The die can be made smaller by reducing the number of photosensor sites.

For scanners having arrays of lenses, the photosensor arrays are typically fabricated as an assembly comprising multiple segments. Given segments of a particular size, the cost of the overall assembly may be reduced by reducing the number of segments.

In the following examples, the number of photosites is reduced, and mechanical displacement of the photosensor array is used to capture all the pixels.

Figure 1:
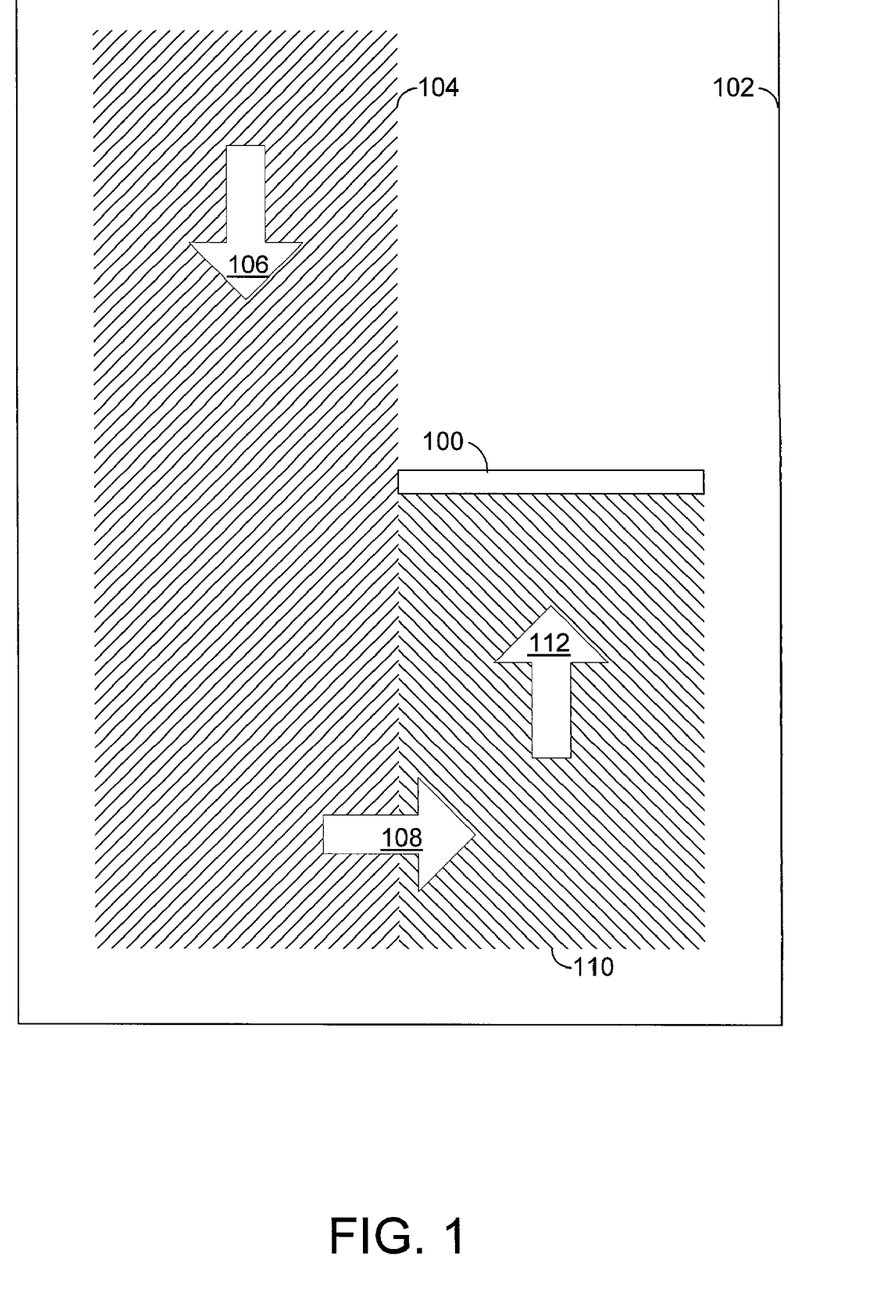
FIG. 1 is a top view of a scanner, illustrating a first example embodiment of a photosensor array scanning by moving in two dimensions.

FIG. 1 illustrates part of an example embodiment of a scanner as viewed through a transparent platen 102. A document (not illustrated) may be positioned face down on top of the platen for scanning. A contiguous photosensor array 100 is moved, as indicated by arrows 106, 108, and 110. Area 104 depicts an area that has been previously scanned, and area 110 depicts an area that is being scanned. In particular, area 104 depicts an area that was scanned earlier with photosensor array 100 positioned to the left (as viewed in FIG. 1), and moving in the direction indicated by arrow 106. At the end of the scan of area 104, the photosensor array was translated to the right (indicated by arrow 108), the direction of scanning was reversed (indicated by arrow 112), and the photosensor array 100 started scanning area 110. Areas 104 and 110 may overlap.

Photosensor array 100 is approximately one-half the length needed to scan a scanline having a length equal to the combined widths of areas 104 and 110. If photosensor array 100 is fabricated from a single die, then the array can be less expensive than an array that is approximately twice as long. If photosensor array 100 is fabricated from multiple segments, then the array can be less expensive than an array that requires approximately twice as many segments. Viewed alternatively, given a photosensor array of a length as depicted by photosensor array 100 in FIG. 1, the scanline length can be approximately doubled.

Figure 2:
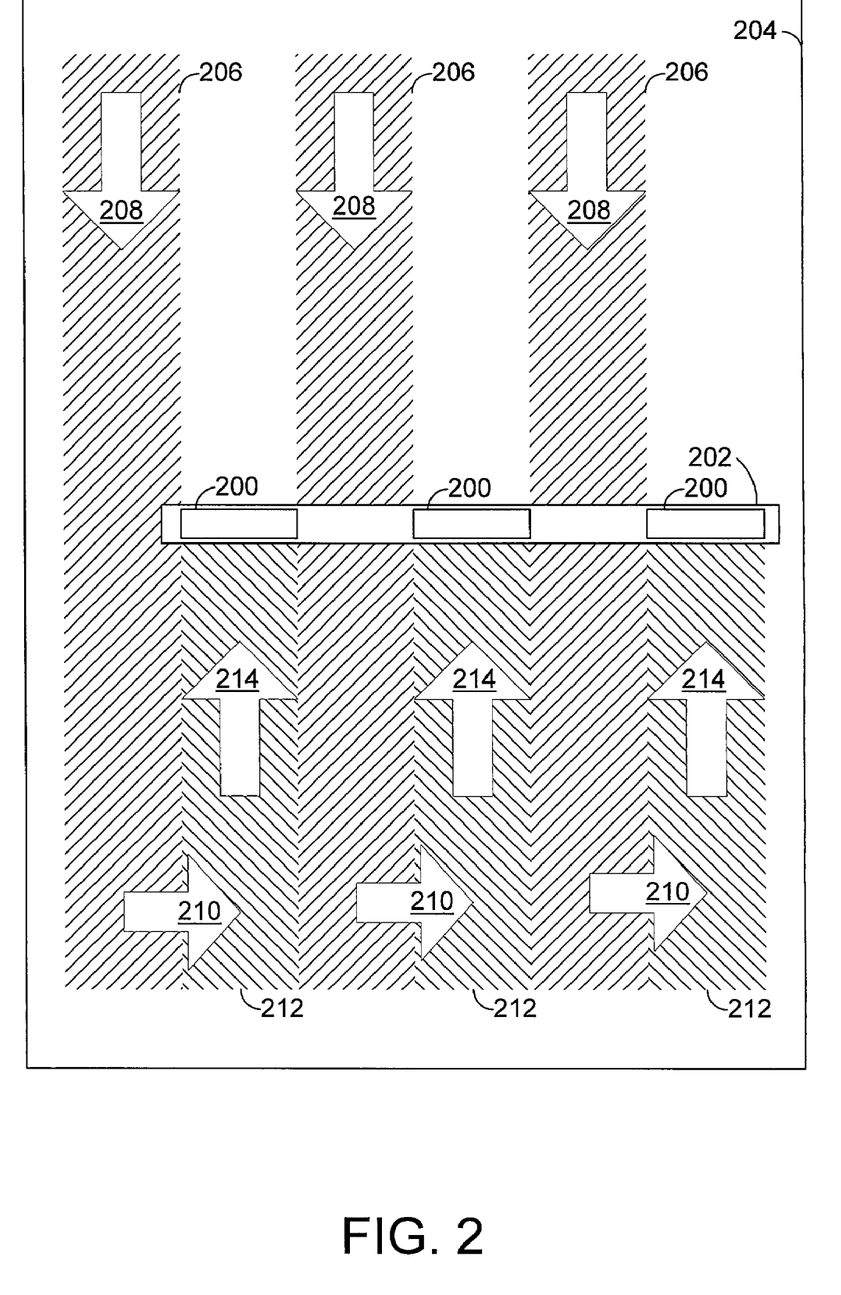
FIG. 2 is a top view of a scanner, illustrating a second example embodiment of a photosensor array scanning by moving in two dimensions.

FIG. 2 illustrates an alternative embodiment of a scanner as viewed through a transparent platen 204. In FIG. 2, a segmented photosensor assembly 202 comprises three separated photosensor array segments 200. The number three is arbitrary and is for illustration purposes only. Areas 206 depict areas that have been scanned, and areas 212 depict areas that are being scanned. In particular, areas 206 depict areas that were scanned earlier with photosensor assembly 202 positioned to the left (as viewed in FIG. 2) and moving in a direction indicated by arrows 208. At the end of the scan of areas 206, the photosensor assembly 202 was translated to the right (indicated by arrows 210), the direction of scanning was reversed (indicated by arrows 214), and the photosensor array segments 200 started scanning areas 212. Areas 206 and 212 may overlap.

Approximately half as many segments are needed relative to a contiguous assembly that is the width of areas 206 and 212 combined, thereby reducing cost. Viewed alternatively, given three photosensor array segments of a total length as depicted in FIG. 2, the scanline length can be approximately doubled.

A motor, a solenoid, a voice coil, or other active device, may be used to move a photosensor array in a first dimension (for example, FIG. 1, directions 106 and 112, or FIG. 2, directions 208 and 214). A separate motor, solenoid, voice coil, or other active device may be used to move a photosensor array in a second dimension, (for example, FIG. 1, direction 108, or FIG. 2, direction 210). However, preferably, as illustrated in the following example embodiments, a single motor or other active device is used to move a photosensor array in two dimensions, further reducing cost by eliminating one motor or other active device.

One example is to mount a photosensor array or assembly, as in FIG. 1, 100, or FIG. 2, 202, onto a two-dimensional linear stepper motor. For example, a scanner base may be formed with a toothed surface, and active coils may be implemented on the photosensor array, with teeth on the bottom surface of the photosensor array. The array can then be stepped to any X-Y location on the base of the scanner.

In each of the following examples, a single rotational motor is used to move a photosensor array in two dimensions.

Figure 3A:
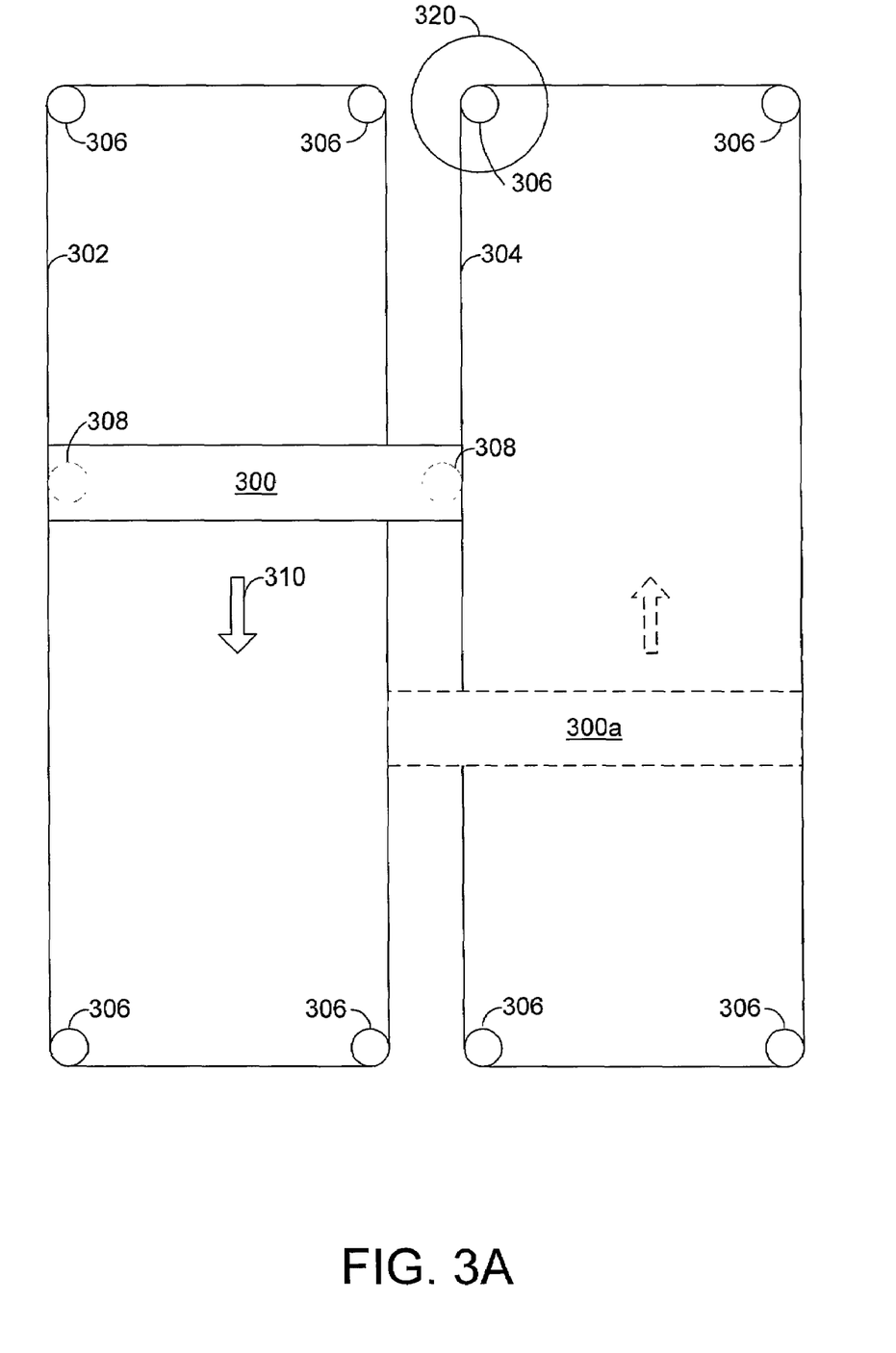
FIG. 3A is a top view of a scanner, illustrating a first example embodiment of an apparatus for moving a photosensor array in two dimensions.

FIG. 3A illustrates a first example scanner in which a single rotational motor can move a photosensor array in two dimensions. A photosensor array (or assembly) 300 is attached to two flexible drive members (for example, belts, cables, chains, etc.). In particular, one end of the photosensor array 300 is attached to a first flexible drive member 302 by a rotating tab 308 (additional detail is provided in FIG. 3B), and a second end of the photosensor array 300 is attached to a second flexible drive member 304 by a second rotating tab 308. Each flexible drive member (302, 304) passes around four pulleys 306. For scanning motion, any of the pulleys may be driven, or one of the flexible drive members may be separately driven. In the example illustrated in FIG. 3A, a single motor 320 directly drives one pulley 306. If motor 320 drives one pulley counter-clockwise (as viewed in FIG. 3A), the photosensor array 300 is moved in the direction indicated by arrow 310. At the end of the scanner, the photosensor array is translated to the right, and then the direction of scanning is reversed, and the photosensor array is positioned as depicted by reference number 300a. The scanning path of the photosensor array 300 is defined by the path of the flexible drive members. In the example embodiment of FIG. 3A, and in the other example embodiments below, the direction of travel of the photosensor array may be reversed. That is, a generally counter-clockwise motion is used for illustration, but the motion may be generally clock-wise or any other path that scans the area of interest.

Figure 3B:
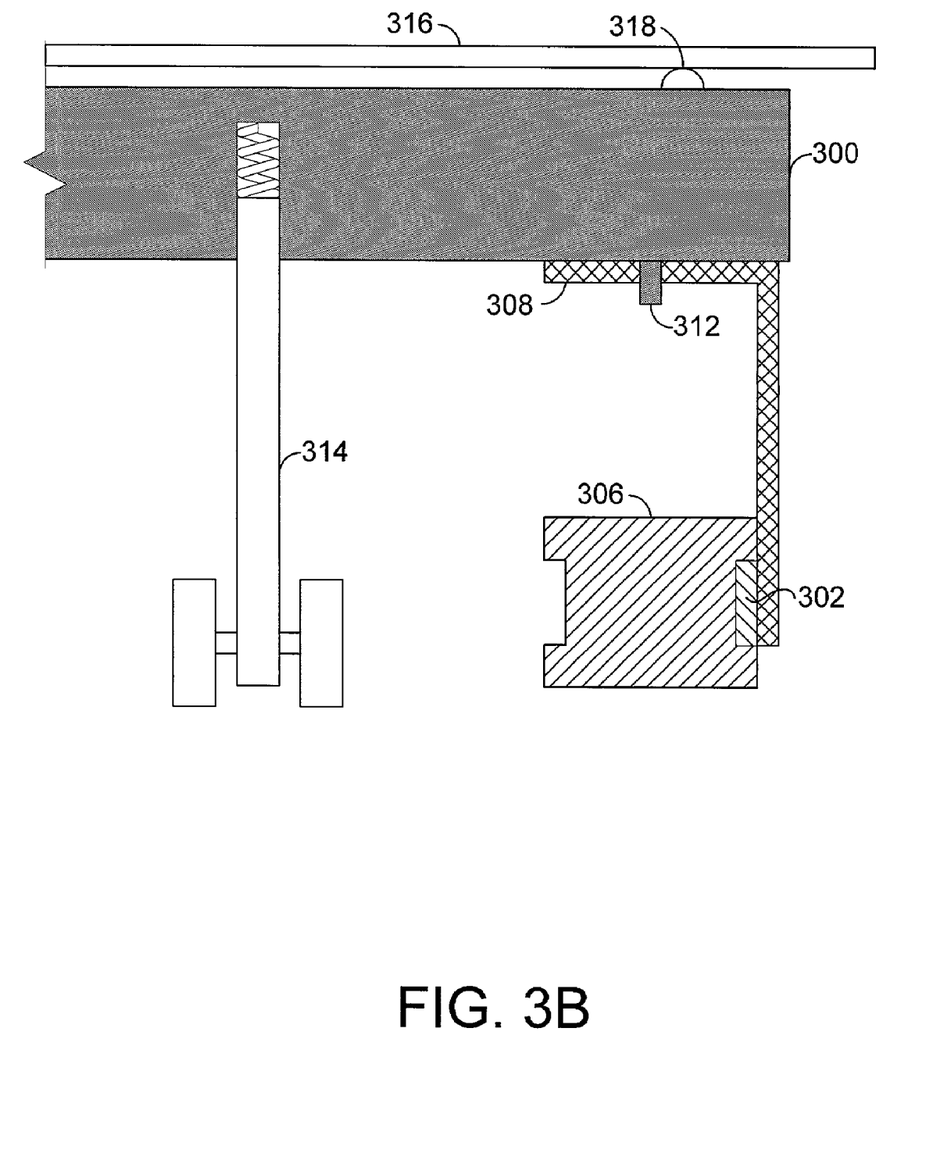
FIG. 3B is a cross-section view of part of the scanner of FIG. 3A, illustrating additional detail and optional features.

FIG. 3B illustrates a cross section of part of the scanner of FIG. 3A, depicting the photosensor array positioned over one of the pulleys 306. The tab 308 connecting the photosensor array 300 to the flexible drive member 302 rotates around a post 312. This prevents twisting of the tab 308 as the tab travels around the pulleys 306. In addition, note that the thickness of the flexible drive member 302 enables the tab 308 to clear a flange on the pulley. Optionally, the photosensor array 300 may be held at a constant distance from a platen 316 by a low friction spacer 318. In the example of FIG. 3B, a wheeled support 314 is spring loaded into the photosensor array 300, illustrating one example of a way to hold the photosensor array against the platen. The support 314 may roll on a base of the scanner.

Figure 4A:
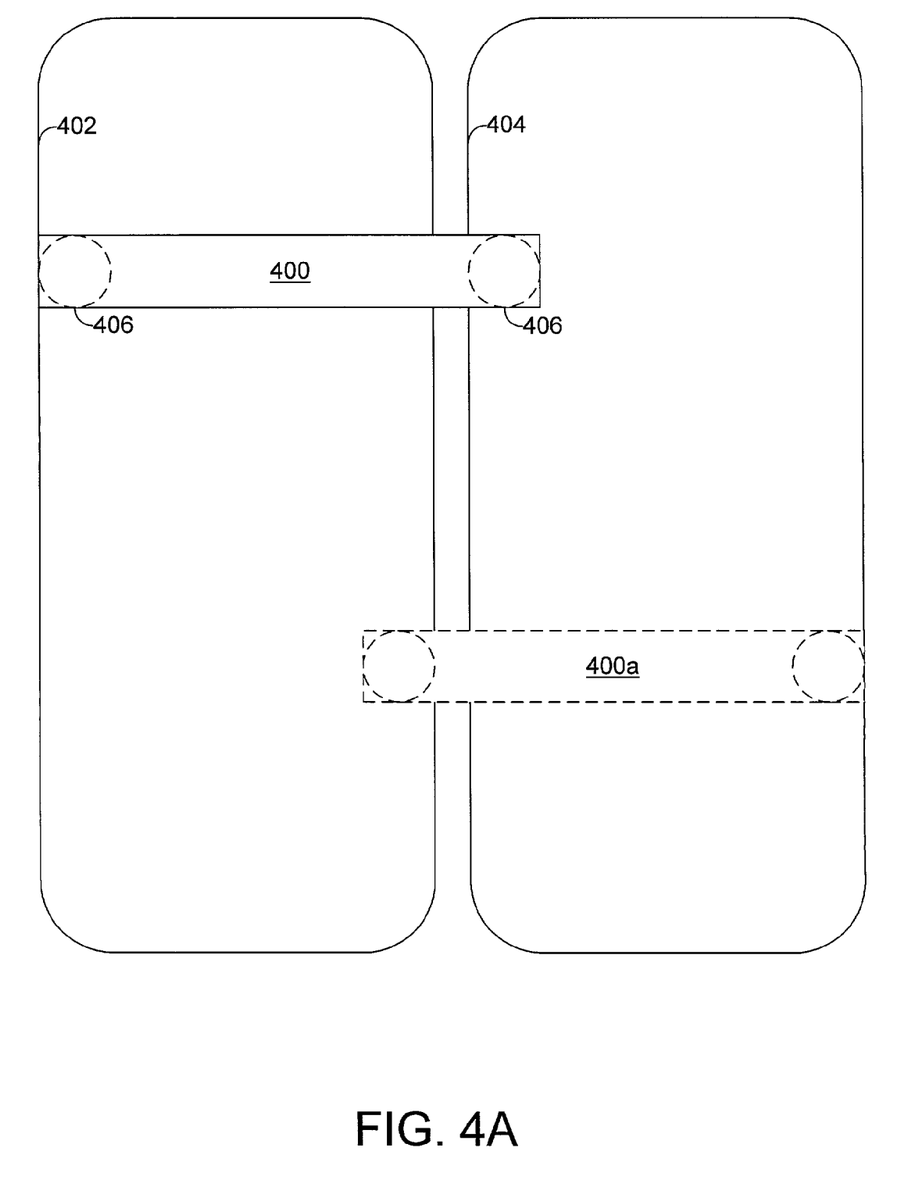
FIG. 4A is a top view of a scanner, illustrating a second example embodiment of an apparatus for moving a photosensor array in two dimensions.

FIG. 4A illustrates a second example embodiment of a scanner in which a single rotational motor can move a photosensor array in two dimensions. A photosensor array (or assembly) 400 has two wheels or gears 406 (additional detail is provided in FIG. 4B) that travel along rigid guide walls 402 and 404. A single motor, mounted on the photosensor array, may drive one or both wheels or gears 406. If one of the wheels or gears 406 is driven clockwise (as viewed in FIG. 4A), the photosensor array 400 moves toward the bottom of the figure, is then translated to the right, and the direction of scanning is then reversed, and the photosensor array is positioned as depicted by reference number 400a. In the embodiment of FIG. 4A, the path of the movement of the photosensor array is defined by the path of a rigid wall.

Figure 4B:
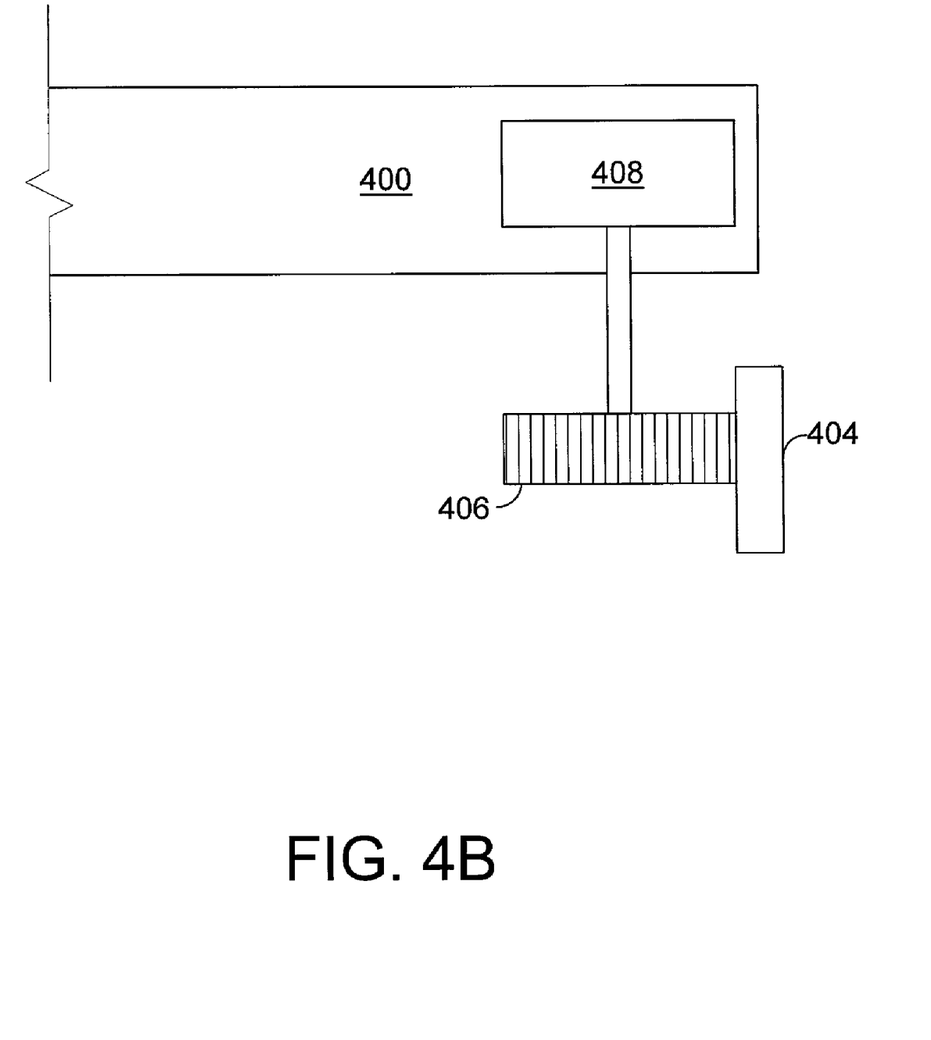
FIG. 4B is a cross section of part of the scanner of FIG. 4A.

FIG. 4B provides additional detail. In the example of FIG. 4B, a motor 408 directly drives a gear 406, which meshes with matching teeth in a rigid wall 404. Motor 408 may optionally also drive another wheel or gear 406 which engages wall 402 (FIG. 4A). The rigid walls (402, 404), with or without teeth, may optionally be molded as part of a base of the scanner. The photosensor array 400 may optionally be held at a constant distance from a platen, as illustrated in FIG. 3B.

Figure 5:
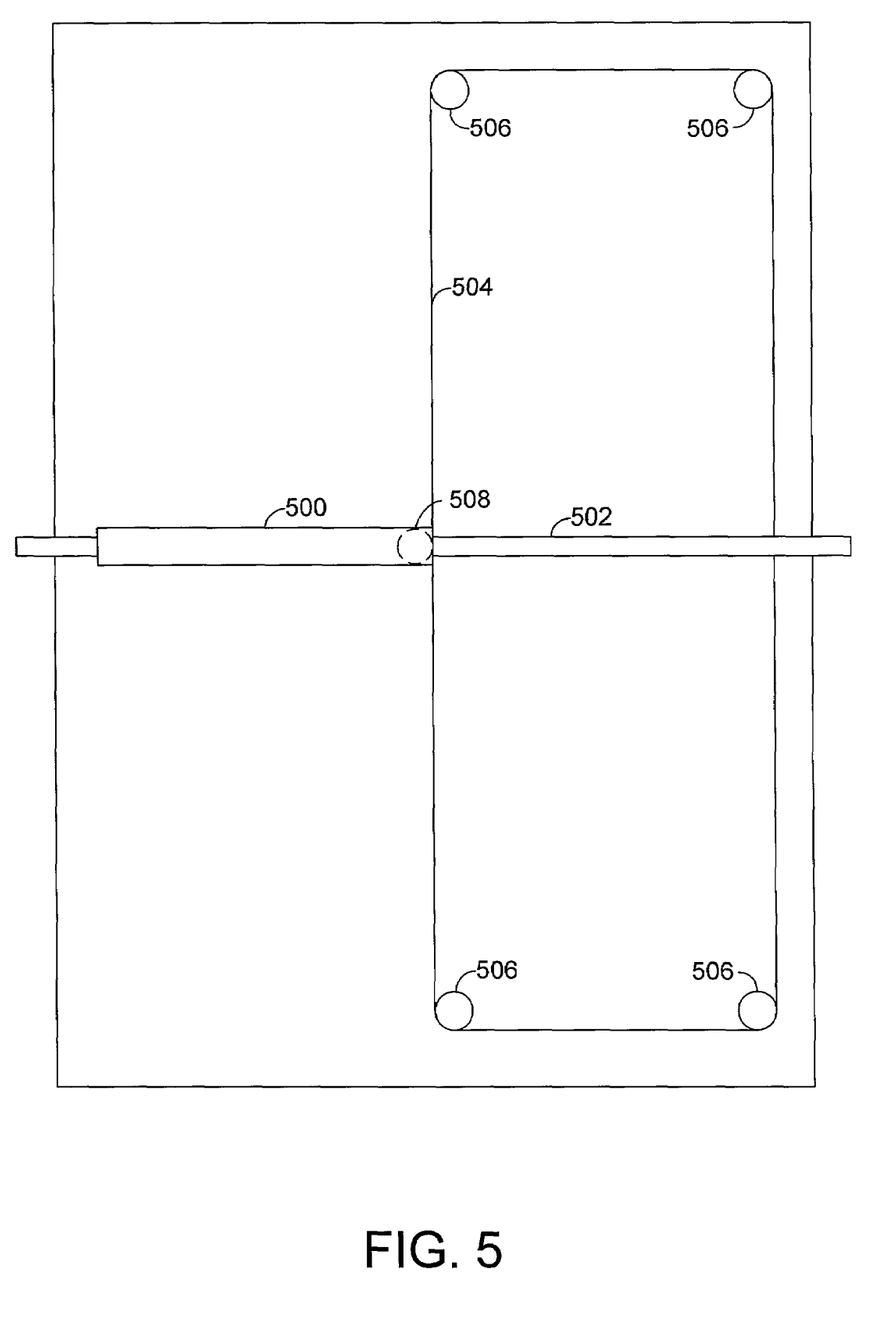
FIG. 5 is a top view of a scanner, illustrating a third example embodiment of an apparatus for moving a photosensor array in two dimensions.

FIG. 5 illustrates a third example embodiment of a scanner in which a single rotational motor can move a photosensor array in two dimensions. A photosensor array (or assembly) 500 is moveably supported on a movable rigid support 502. The support 502 may be mounted on one or more guides (not illustrated) for movement in one dimension. The photosensor array 500 is attached to a flexible drive member 504, using a rotating tab 508 (for example, as illustrated by tab 308 in FIG. 3B). The flexible drive member 504 rotates around four pulleys 506. Any of the pulleys may be driven by a motor (not illustrated) to move the flexible drive member 504. If the flexible drive member is moved counterclockwise (as viewed in FIG. 5), photosensor array 500 is moved downward, then is translated to the right along the support 502 as tab 508 is pulled around a first pulley 506, then upward after tab 508 is pulled around a second pulley 506, and so forth. Note that in the example of FIG. 5, a motor drives a flexible drive member, which in turn drives a photosensor array (or assembly), which in turn drives a support. The photosensor array is held at predetermined positions on the support by the flexible guide member, and the scan path is determined by the path of the flexible guide member.

Figure 6:
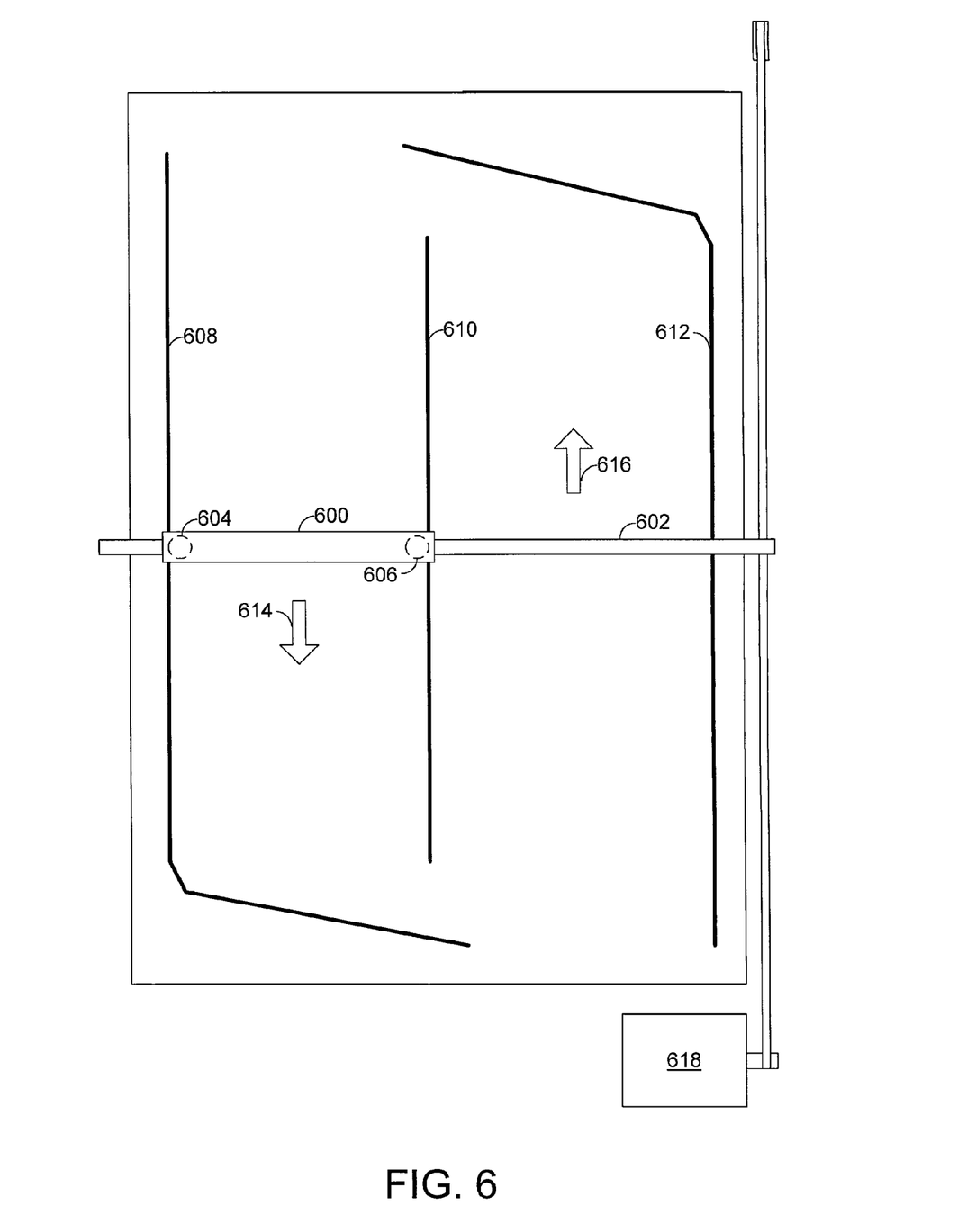
FIG. 6 is a top view of a scanner, illustrating a fourth example embodiment of an apparatus for moving a photosensor array in two dimensions

FIG. 6 illustrates a fourth example embodiment of a scanner in which a single rotational motor can move a photosensor array in two dimensions. A photosensor array (or assembly) 600 is moveably supported on a movable rigid support 602. The support 602 may be mounted on one or more guides (not illustrated) and may be moved by use of a motor and cables. As illustrated in the example depicted in FIG. 6, a motor 608 drives a belt that passes over a pulley, and the support 602 is attached to the belt. There are numerous other ways in which a scanner support may be moved, as is well known in image scanner mechanisms.

In FIG. 6, the photosensor array 600 is held at one of multiple predetermined positions on the support 602 by rigid guide walls (608, 610, and 612). Rollers 604 and 606, mounted on the photosensor array 600, roll on the rigid guide walls. The motor 618 moves the support 602, and the support 602 moves the photosensor array in one dimension, with the position of the photosensor array on the support determined by guide walls 608 and 610. When the photosensor array nears the end of the scanner, roller 604 on the photosensor array follows the guide wall 608, forcing the photosensor to translate to the right along the support 602. The direction of travel of the support 602 is then reversed, and the position of the photosensor array on the support is determined by the guide walls 610 and 612.

In FIGS. 3A, 4A, 5, and 6, the photosensor array is depicted as completing a scan of an overall area in two swaths. It may be preferable to provide an even lower cost, by reducing the number of photosensors further, and requiring more than two swaths to complete each scanline. Alternatively, given a photosensor length, more than two swaths enables scanning of even larger documents.

Figure 7:
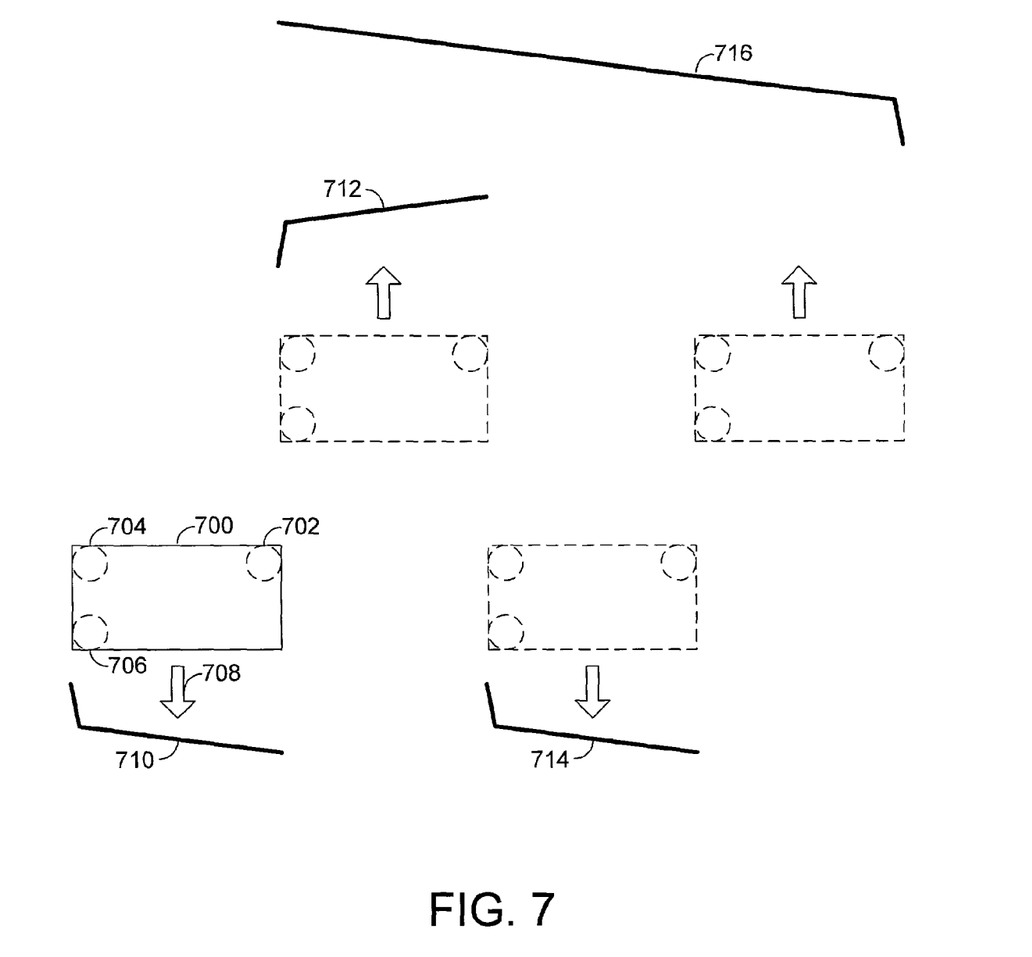
FIG. 7 is a top view of a scanner, illustrating an example variation of the fourth example embodiment.

FIG. 7 illustrates a photosensor array (or assembly) 700 capable of making four swaths for each scanline. Photosensor array 700 is illustrated with three rollers (702, 704, and 706). When photosensor array 700 is moving in the direction depicted by arrow 708, roller 706 contacts a deflector 710, and the photosensor array is translated to the right (as viewed in FIG. 7). The scanning direction is then reversed and eventually roller 704 contacts a deflector 712, and the photosensor array is translated further to the right. The scanning direction is reversed again, and eventually roller 706 contacts a deflector 714, and the photosensor array is translated further to the right. The scanning direction is reversed again, and eventually roller 702 contacts a deflector 716, and the photosensor array is translated to the left to the starting position.

Optionally, the photosensor array 700 of FIG. 7 may be held at predetermined positions on a support by guide walls as depicted in FIG. 6. Alternatively, as discussed in more detail below, the photosensor array may be lightly held at predetermined positions, and the holding force may be overcome by the translation force provided by forcing the photosensor array rollers against the deflectors. If the photosensor array is lightly held at predetermined positions, then as illustrated in FIG. 7, where the guide walls bend to translate the photosensor along the support, the guide walls may have an initial region where the deflection is relatively small, but where the deflection force is relatively large to overcome the force keeping the photosensor array lightly held at one of the predetermined positions on the support. Once the photosensor array is freed from the retaining force, the deflection of the photosensor array may be increased relative to the distance moved by the support to reduce the distance the support has to travel to translate the photosensor array along the support. A parabolic shape may be used to provide a constant force and smooth motion.

Figure 8A:
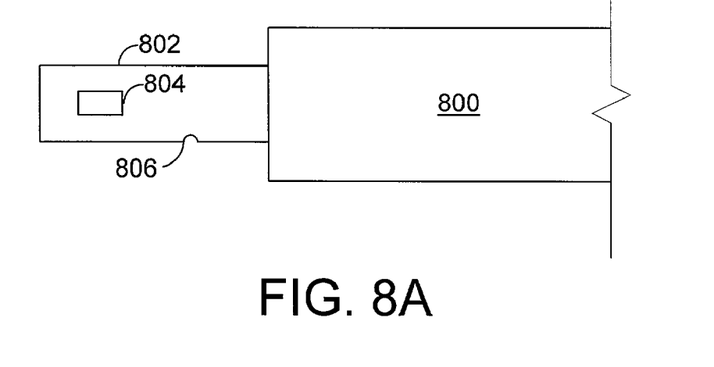
FIG. 8A is a top view of part of scanner, illustrating two alternative example embodiments for holding a photosensor array at a predetermined position on a support.

FIG. 8A illustrates two alternative ways to hold a photosensor array at a predetermined position on a support (without guide walls). A photosensor array 800 can move along a support 802. Reference 804 depicts a magnet, where one end of the photosensor array 800 may be held against the magnet. The photosensor array may have matching magnets, or the photosensor array may have end surfaces of a ferrous or other material that may be attracted to a magnet. As an alternative, a detent 806 in the support 802 may be used to receive a flexible protrusion on the photosensor array (further illustrated in FIG. 8C).

Figure 8B:
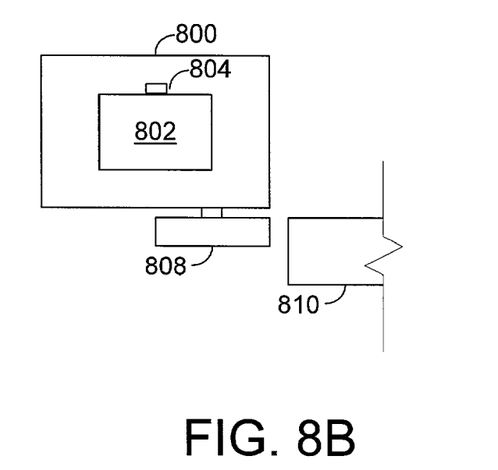
FIG. 8B is a side view of the part of the scanner of FIG. 8A, illustrating additional detail for scanners as in FIGS. 6 and 7.

FIG. 8B is a side view, illustrating the magnet 804. In addition, FIG. 8B illustrates a roller 808 on the bottom of the photosensor array 800 and a guide wall or deflector 810. Note that the photosensor array can clear the top of the guide wall or deflector while the roller is in contact. A roller is used for illustration, but it is not necessary. A low friction pad may be used, or the deflector may simply contact a projection on the lower part of the photosensor array.

Figure 8C:
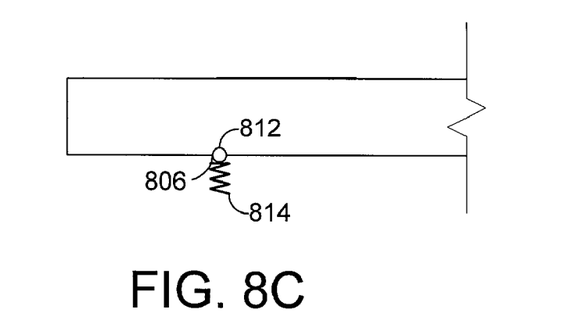
FIG. 8C is a top view of part of the scanner of FIG. 8A, illustrating additional detail for one of the alternative example embodiments for holding a photosensor array at a predetermined position on a support.

FIG. 8C illustrates an example embodiment of a flexible protrusion. In FIG. 8C, the flexible protrusion is a spherical bearing 812 being held by a spring into the notch 806 in the support. The force of the spring may be overcome by the force of the photosensor array being forced against a guide wall or deflector.

What is claimed is:

1. An image scanner, comprising:
   an array of photosensors attached to a flexible drive member; and
   a motor driving the flexible drive member to move the array of photosensors in two dimensions in a plane substantially parallel to an image being scanned, along a path defined by the flexible drive member.

2. The image scanner of claim 1, the motor being a rotational motor.

3. A method of scanning, comprising:
   moving, using a motor, a flexible drive member attached to a photosensor array in a two-dimensional path, the two-dimensional path in a plane substantially parallel to an image being scanned, and the two-dimensional path being defined by the flexible drive member.

* * * * *